J. R. RANDALL.
COMBINATION HOE, EXTENSION MARKER, AND WEEDER.
APPLICATION FILED AUG. 19, 1919.
1,339,222.
Patented May 4, 1920.
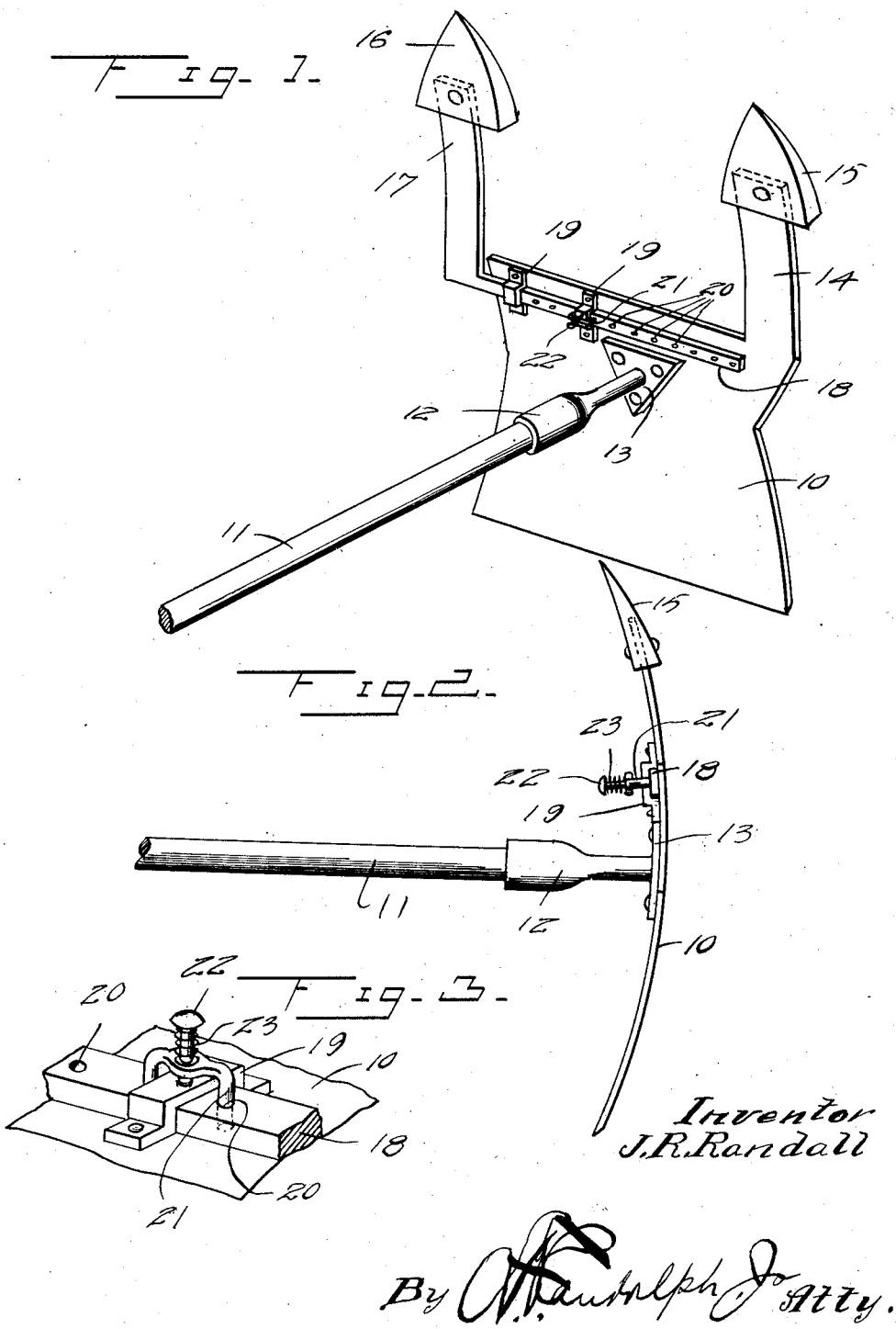
Inventor
J. R. Randall

UNITED STATES PATENT OFFICE.

JAMES R. RANDALL, OF BONNIE, ILLINOIS.

COMBINATION HOE, EXTENSION-MARKER, AND WEEDER.

1,339,222.　　　　Specification of Letters Patent.　　Patented May 4, 1920.

Application filed August 19, 1919. Serial No. 318,494.

*To all whom it may concern:*

Be it known that I, JAMES R. RANDALL, a citizen of the United States, residing at Bonnie, in the county of Jefferson and State of Illinois, have invented certain new and useful Improvements in Combination Hoes, Extension-Markers, and Weeders; and I do hereby declare the following to be a full, clear, and exact description of the invention, such as will enable others skilled in the art to which it appertains to make and use the same.

This invention relates to an improved combination agricultural implement of the hoe type and the principal object of the invention is to provide an implement of the character described so constructed that it may be used either as a hoe or weeder or as a marker by means of which plants may be set the proper distance apart.

Another object of the invention is to so construct this implement that the marker blade may constitute one of the blades of the weeder and to further so construct this marker blade that the shank thereof may be easily adjusted and firmly but releasably held in the adjusted position.

Another object of the invention is to so construct this implement that it may be formed principally of heavy sheet metal if desired.

Another object of the invention is to so construct this implement that it will be simple in construction and very strong and durable.

This invention is illustrated in the accompanying drawings, wherein:

Figure 1 is a perspective view of the improved implement.

Fig. 2 is a side elevation of the improved implement.

Fig. 3 is an enlarged fragmentary perspective view showing the manner of releasably holding the marker in an adjusted position.

This implement is provided with a main blade or hoe blade 10 with which the handle 11 is connected through the medium of a socket bracket 12 connected with the hoe blade by means of a base plate 13. This hoe blade is provided at one side with an upwardly extending arm 14 which carries a weeding blade 15 substantially triangular in shape and curved transversely. The hoe blade is curved longitudinally and the arm 14 is also curved longitudinally in the arc of the hoe blade thereby permitting this implement to be used without danger of being easily bent out of shape. A second weeding blade 16, which will constitute the marker and is of a similar shape to the blade 15, is mounted upon an arm 17 from which extends an attaching bar 18. This attaching bar 18 extends inwardly from the arm 17 and transversely across the upper portion of the hoe blade through the supporting and guiding brackets 19 and is provided with openings 20 to receive the fastener releasably holding the attaching bar in a set position upon the hoe blade. This fastener in the form shown consists of a latch 21 which is U-shaped and is slidably mounted upon a pin 22 and yieldably held in an operative position through the medium of the spring 23. When in the operative position, the arms of the latch extend through openings of the attaching bar thereby securely holding the bar against longitudinal movement and retaining the second weeding blade or marking blade at the desired distance from the weeding blade 15.

When in use as a hoe, this implement will be used in the ordinary manner and will be held by the handle and the hoe blade 10 used to cut into the ground. If it is desired to use this implement as a weeder, the position will be reversed to bring the weeding blades 15 and 16 lowermost thereby providing a two-blade weeder which may be used for weeding and cultivating between the rows of plants or around a plant in a row. By making proper adjustment, the blades 15 and 16 may be set the desired distance apart so that the weeder may be used between or about the plants without danger of the plant stalk being cut or otherwise damaged while weeding. When it is desired to use this device as a marker, the second weeding or marking blade will be set the desired distance from the blade 15 and in digging into the ground marks will be formed therein the desired distance apart. A plant can then be set at the first mark after a sufficient opening has been made with the hoe and the marker then advanced along the row to bring one blade into engagement with the mark previously formed. A second mark will thus be formed the desired distance from the first mark, thereby causing the plants in a row to be set at an even distance apart. It will thus be seen that this implement takes the place of a hoe, a weeder and a marker and therefore this implement takes the place of the three separate implements and makes it unnecessary to carry more than one implement to a field. It will be further seen that this implement is simple in construction and cheap to produce and at the same time is very strong and durable.

What is claimed is:

1. An agricultural implement comprising a hoe blade longitudinally curved, an arm extending from one end portion of the hoe blade longitudinally curved in the arc of the hoe blade, a weeding blade carried by said arm and curved transversely and substantially triangular in shape, a second weeding blade, an arm carrying the second weeding blade, an attaching bar extending from the second arm and extending transversely across the upper portion of the hoe blade, means slidably connecting the attaching bar with the hoe blade, means for releasably holding the attaching bar in a set position upon the hoe blade, and a handle for the hoe blade.

2. An agricultural implement of the character described comprising a hoe blade having an operating handle, an arm extending from the hoe blade adjacent one side, a weeding blade carried by said arm, a second weeding blade, an arm carrying said second weeding blade, an attaching bar extending from the second arm transversely across said hoe blade, means for slidably connecting the attaching bar with the hoe blade, and means for releasably holding the attaching bar in a set position.

3. An agricultural implement of the character described comprising a hoe blade, an arm extending from one side portion of the hoe blade, a weeding blade carried by said arm, brackets carried by the hoe blade, a second weeding blade, an arm carrying the second weeding blade, an attaching bar extending from the second arm through the brackets of the hoe blade and provided with openings, a pin extending from one of the brackets, a latch slidably mounted upon the pin for fitting into the openings of the attaching bar, and resilient means upon the pin engaging the latch to yieldably hold the same in an operative position.

In testimony whereof I affix my signature in presence of two witnesses.

JAMES R. RANDALL.

Witnesses:
S. J. HICKS,
B. F. RANDALL.